(12) United States Patent
Harikae et al.

(10) Patent No.: US 7,198,085 B2
(45) Date of Patent: Apr. 3, 2007

(54) TIRE/WHEEL ASSEMBLY

(75) Inventors: Shinya Harikae, Hiratsuka (JP); Eiichi Iida, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 0 days.

(21) Appl. No.: 10/512,945

(22) PCT Filed: Jul. 29, 2003

(86) PCT No.: PCT/JP03/09595

§ 371 (c)(1),
(2), (4) Date: Nov. 1, 2004

(87) PCT Pub. No.: WO2004/018240

PCT Pub. Date: Mar. 4, 2004

(65) Prior Publication Data

US 2005/0139304 A1 Jun. 30, 2005

(30) Foreign Application Priority Data

Aug. 23, 2002 (JP) .............................. 2002-243181

(51) Int. Cl.
B60C 17/06 (2006.01)
(52) U.S. Cl. ...................... 152/400; 152/520
(58) Field of Classification Search ............... 152/156, 152/158, 520, 247, 248, 400, 381.5, 399, 152/401, 516
See application file for complete search history.

(56) References Cited

U.S. PATENT DOCUMENTS

| | | | |
|---|---|---|---|
| 4,641,670 A * | 2/1987 | Poque et al. .................. | 152/158 |
| 6,463,974 B1 * | 10/2002 | Hellweg et al. ............. | 152/400 |
| 6,672,349 B1 * | 1/2004 | Glinz et al. .................. | 152/156 |
| 6,843,288 B2 * | 1/2005 | Seko et al. ................... | 152/156 |
| 6,843,289 B2 * | 1/2005 | Shimura et al. ............. | 152/156 |
| 7,036,543 B2 * | 5/2006 | Mori ........................... | 152/400 |
| 2002/0195183 A1 * | 12/2002 | Glinz et al. .................. | 152/400 |

FOREIGN PATENT DOCUMENTS

| | | |
|---|---|---|
| JP | 62-054003 A | 4/1987 |
| JP | 10-297226 A1 | 11/1998 |
| JP | 2001-519279 A1 | 10/2001 |
| JP | 2004058795 A * | 2/2004 |
| WO | WO-99/064260 A1 | 12/1999 |

* cited by examiner

OTHER PUBLICATIONS

International Search Report for PCT/JP03/09595 mailed on Nov. 4, 2003.

*Primary Examiner*—Russell D. Stormer
(74) *Attorney, Agent, or Firm*—Rader, Fishman & Grauer PLLC

(57) ABSTRACT

A tire/wheel assembly, wherein bent parts (4f) bent outward are formed at the leg end parts of an annular shell (4), an inclination angle ($\alpha 1$) of a line segment L1 extending from the axially outer end (P3) of the bent part (4f) through the apex (P1) of a hump (1f) on a rim relative to a direction perpendicular to a tire axis is set to within ±5° in a cross section orthogonal to the circumferential direction of the annular shell (4), the area (4s) of the annular shell equal to the height (B) of at least 35% of the height (A) from the radially inner end of the annular shell is formed linearly, the inclination angle ($\alpha 2$) of an extension line (L2) along the inner surface of the linear area (4s) relative to the direction perpendicular to the tire axis is 15 to 30° in axial inner side, and the extension line (L2) passes between the apex (P1) of the hump (1h) and the toe tip (P2) of a tire bead part.

7 Claims, 1 Drawing Sheet

US 7,198,085 B2

TIRE/WHEEL ASSEMBLY

TECHNICAL FIELD

The present invention relates to a tire/wheel assembly, and more specifically relates to a tire/wheel assembly with the run-flat durability further enhanced by improving the capability to prevent a tire bead from being demounted.

BACKGROUND ART

Many technologies for allowing emergency driving for hundreds of kilometers even when a pneumatic tire goes flat while a vehicle is running have been proposed based on market demands. Among these many proposals, technologies which were proposed in the Japanese Patent Laid-Open Publications No. 10-297226 and No. 2001-519279 enable run-flat running by attaching a core to a rim within a hollow part of a pneumatic tire mounted on the rim and thus supporting the tire with the core when the tire goes flat.

The aforementioned run-flat core (support body) includes an annular shell and elastic rings. The annular shell has an open-leg structure with the outer peripheral side serving as a support surface and with the inner peripheral side formed into open legs. The elastic rings are attached to the two legs of the run-flat core. Thus, the run-flat core is supported on the rim via the elastic rings. This run-flat core can be used as it is without making any special modifications to existing wheels/rims. Accordingly, the run-flat core has an advantage in that the run-flat core may be acceptable to the market without causing any confusion there.

In the case of the tire/wheel assembly (wheel) having the aforementioned structure, however, a tire bead is sometimes demounted from a rim when the tire goes flat and run-flat running is performed. Thus, further run-flat running may become impossible. For this reason, while it is the most important required characteristic for the run-flat core (support body) to have a function of supporting the weight of the vehicle body during the run-flat running, it is also an important required characteristic to have an excellent function of preventing the tire bead from being demounted in terms of improvement in the run-flat durability.

DISCLOSURE OF THE INVENTION

An object of the present invention is to provide a tire/wheel assembly with the run-flat durability further enhanced by improving the capability to prevent a tire bead from being demounted.

A tire/wheel assembly of the present invention to achieve the aforementioned object is characterized in that, in a tire/wheel assembly having a run-flat support body inserted in a hollow part of a pneumatic tire, the run-flat support body including: an annular shell having an outer peripheral side as a support surface and having an inner peripheral side formed into fork-shaped open legs; and elastic rings supporting the end parts of the fork-shaped open legs on a rim, bent parts bent outward are formed at the leg end parts of the annular shell; in a cross section of the annular shell perpendicular to a circumferential direction, an inclination angle $\alpha_1$ of a line segment L1 relative to the direction perpendicular to the tire axis is set to within ±5°, the line segment L1 extending from the axially outer end P3 of each of the bent parts through a hump apex P1 on the rim; an area of the annular shell equal to a height B of at least 35% of a cross-sectional height A from the radially inner end of the annular shell is formed linearly; an inclination angle $\alpha_2$ of an extension line L2 along the inner surface of the linear area relative to the direction perpendicular to the tire axis is set to 15 to 30° axially inward; and the extension line L2 passes between the hump apex P1 on the rim and a toe tip P2 of the tire bead.

As described above, the bent parts are formed at the end parts of the annular shell, and the direction of the line segment L1 extending from the axially outer end P3 of the bent part to the hump apex P1 on the rim is set to be substantially perpendicular (inclination angle $\alpha_1$ is within ±5°) to the tire axis. Thus, the load from the annular shell during the run-flat running is properly supported, and good run-flat running is maintained. In addition, the area of the annular shell equal to the height B, which is at least 35% of the cross-sectional height A from the radially inner end, is formed linearly, and the extension line L2 along the inner surface of the linear area is set to incline inward (inclination angle $\alpha_2$ is 15 to 30° axially inward) relative to the direction perpendicular to the tire axis and to pass between the hump apex P1 on the rim and the toe tip P2 of the tire bead. Accordingly, it is possible to cause a part of the load applied to the annular shell during the run-flat running to act as a force component which presses the tire bead against the rim flange through the elastic ring, thereby preventing the tire bead from being demounted from the rim.

BEST MODES FOR CARRYING OUT THE INVENTION

Figure 1:
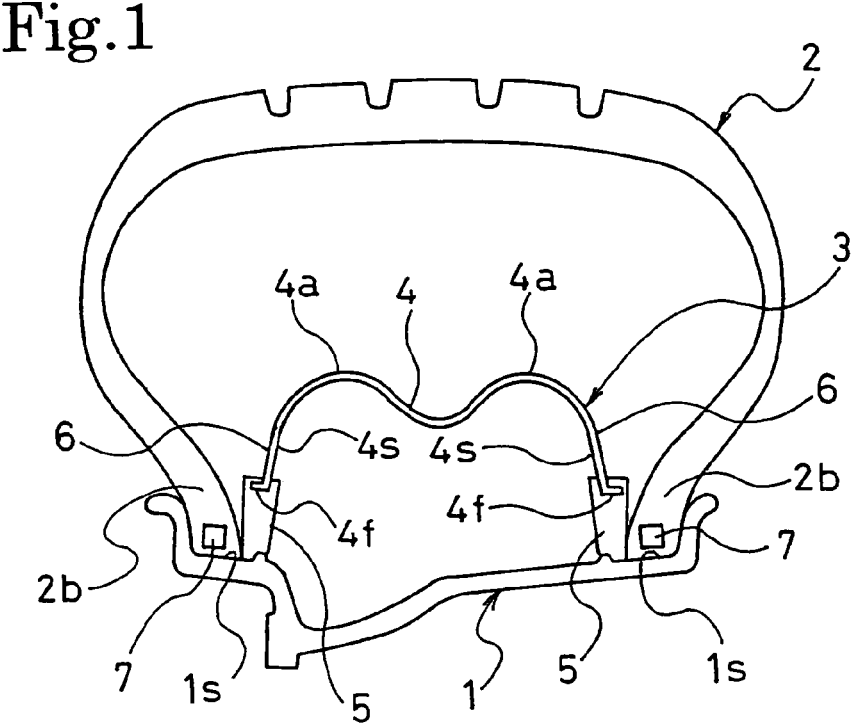
FIG. 1 is a meridian cross-sectional view showing a main portion of a tire/wheel assembly according to an embodiment of the present invention.

In the present invention, a run-flat support body is formed as an annular body to be inserted into a hollow part of a pneumatic tire. The outer diameter of this run-flat support body is made smaller than the inner diameter of the hollow part so as to keep a certain distance between the inner surface of the hollow part of the pneumatic tire and the run-flat support body, and the inner diameter of the hollow part is made substantially equal to the inner diameter of the bead of the pneumatic tire. This run-flat support body is mounted on the wheel together with the pneumatic tire in a state in which the run-flat support body is inserted within the pneumatic tire, and thus the run-flat support body is incorporated into the tire/wheel assembly. When this tire/wheel assembly is mounted on a vehicle and a pneumatic tire gets punctured while running, the punctured and flat tire is supported on the outer peripheral surface of the run-flat support body, thereby allowing run-flat running.

The aforementioned run-flat support body comprises the annular shell and the elastic rings as the main parts.

The annular shell has a continuous support surface for supporting the flat tire formed on the outer peripheral side (outer diameter side) thereof. The inner peripheral side (inner diameter side) thereof is formed into fork-shaped open legs with the both sidewalls as legs. The support surface on the outer peripheral side of the annual shell is formed so that the shape thereof in the cross section perpendicular to the circumferential direction is a curve convex toward the outer diameter side. The number of convex parts on the outer peripheral side of the annular shell may be one or more. When the number of convex parts is any plural number, the load which is supported during the run-flat running can be distributed to the plurality of convex parts, thereby enhancing the durability of the annular shell as a whole.

Because the run-flat support body of the present invention must support the vehicle weight through the flat tire, the annular shell thereof is composed of a rigid material. As such a rigid material, metal, resin, or the like is used. Examples of such a metal among these include steel and aluminum. As such a resin, either thermoplastic resin or thermosetting resin can be used. Examples of such a thermoplastic resin include nylon, polyester, polyethylene, polypropylene, polystyrene, polyphenylene sulfide, and ABS, and examples of such a thermosetting resin include an epoxy resin and an unsaturated polyester resin and the like. The resin may be used alone, but also may be blended with reinforcing fibers to be used as a fiber-reinforced resin.

The elastic rings are attached to the end parts of the fork-shaped both legs on the inner diameter side of the annular shell, respectively, and abut on both rim sheets to support the load from the annular shell. Further, in the present invention, the elastic rings have a special structure to be described later in order to improve the effect of preventing the tire bead from being demounted from the rim. The elastic rings comprises rubber or an elastic resin to absorb shock or vibration which the annular shell receives from the flat tire and, further, to prevent the rim sheets from slipping, thereby stably supporting the annular shell.

In the present invention, the annular shell includes flange-shaped bent parts at end parts of the legs joined with the elastic rings. With such bent parts, the joint area between the annular shell and the elastic rings is increased, and large coupling strength can be obtained. Moreover, each of the bent parts transmits the load from the annular shell to the rim and the tire bead in a stable state during the run-flat running.

In addition, the annular shell is configured so that a line segment L1 is at a substantially vertical inclination angle α1 of within ±5°, preferably, within ±2° relative to the direction perpendicular to the tire axis in a cross section of the annular shell perpendicular to the circumferential direction. Herein, the line segment L1 extends from the axially outer end P3 of each of the bent parts so as to pass through a hump apex P1 on the rim sheet via the elastic ring. By setting the inclination angle α1 so as to be substantially vertical, the load applied to the annular shell during the run-flat running is properly supported on the rim (wheel), thus making it possible to maintain the good run-flat running.

In the cross section perpendicular to the circumferential direction, the area of the annular shell equal to the height B of at least 35% of the cross-sectional height A from the radially inner end of the annular shell is formed linearly. An extension line L2 along the inner surface of the linear area is set to pass between the hump apex P1 on the rim sheet and the toe tip P2 of the tire bead while the extension line L2 is at an inclination angle of 5 to 30°, preferably, 20 to 25° axially inward relative to the direction perpendicular to the tire axis. With such a setting, the load applied to the annular shell during the run-flat running generates an axially outward force component through the elastic ring. Thus, the elastic ring acts so as to strongly press the tire bead toward the rim flange side, thereby preventing the tire bead from being demounted from the rim.

In order to obtain such an effect of preventing the tire bead from being demounted, the height B of the linear area formed in each leg of the annular shell needs to be at least 35% of the cross-sectional height A of the annular shell. The height B of the linear area is not particularly limited.

However, when the linear area is too long, the curve of the top part of the annular shell cannot be smoothly formed. Therefore, the height B of the linear area is preferably set to up to 50% of the cross-sectional height A of the annular shell. When the inclination angle α2 of the extension line L2 along the inner surface of the linear area is less than 15°, the force component applied by the elastic ring toward the rim flange side is reduced, thereby failing to obtain the effect of preventing the tire bead from being demounted. When the inclination angle α2 is more than 30°, the elastic ring is likely to buckle under the vertical load.

Hereinafter, the present invention will be concretely described with reference to the drawings.

FIG. 1 is a cross-sectional view (meridian cross sectional view) in the tire width direction, showing a main portion of the tire/wheel assembly (wheel) according to an embodiment of the present invention.

Reference numerals 1, 2, and 3 denote a rim on the outer periphery of the wheel, a pneumatic tire, and a run-flat support body, respectively. These rim 1, pneumatic tire 2, and run-flat support body 3 are formed into an annular shape coaxially around a not-shown wheel rotation axis.

The run-flat support body 3 includes an annular shell 4 formed of a rigid material such as a metal or resin, and elastic rings 5 formed of an elastic material such as hard rubber or an elastic resin. The annular shell 4 is so formed as to have two concave parts 4a and 4a, each having a concave surface, arranged side by side in the tire width direction on the outer peripheral side thereof. The both sidewalls of the inner peripheral side of this annular shell 4 are opened in a fork-shape as legs 6 and 6, respectively. The elastic rings 5 and 5 are attached to the end parts of the sidewalls, respectively.

The run-flat support body 3 configured as described above has the elastic rings 5 and 5 attached to beads 2b and 2b and, at the same time, to rim sheets 1s and is of the rim 1 in a state where the run-flat support body 3 is inserted inside the pneumatic tire 2. In each of the beads 2b, an annular bead core 7 is embedded along a circumferential direction of the tire. Each of the embedded bead cores 7 gives rigidity to each of the beads 2b.

Figure 2:
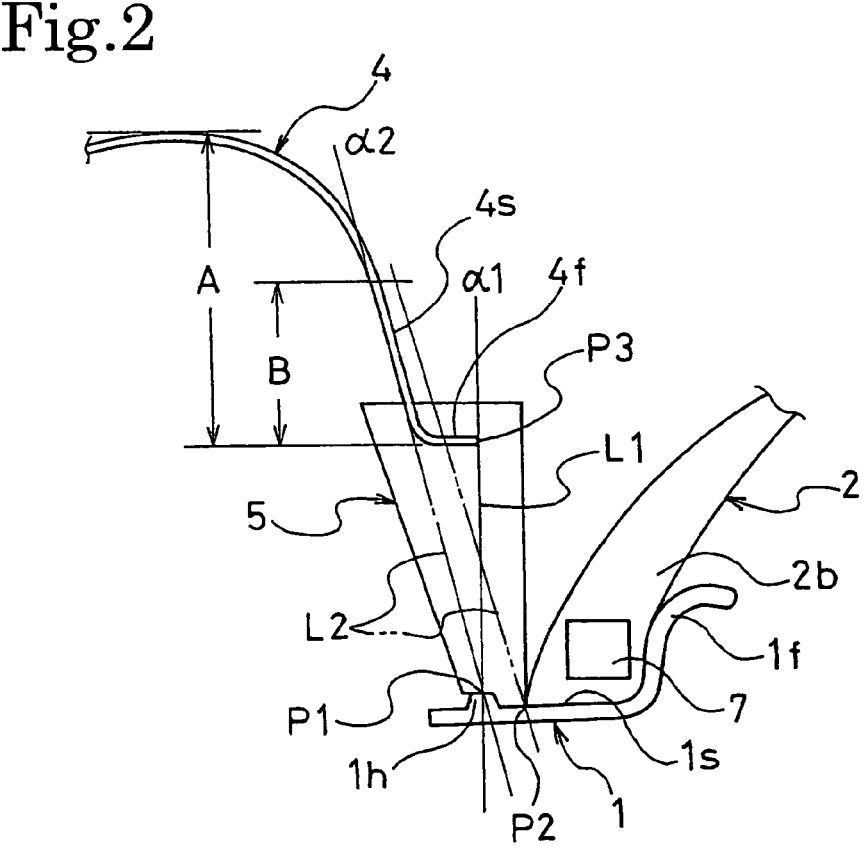
FIG. 2 is a partially-enlarged cross-sectional view showing a tire bead of the tire/wheel assembly of FIG. 1.

As shown in FIG. 2, in the both end parts of the aforementioned annular shell 4, flange-shaped bent parts 4f and 4f are formed, respectively. The bent parts 4f and 4f are integrally joined with the annular elastic rings 5 so as to be embedded on the outer peripheral side of the annular elastic rings. When a line segment L1 extending from the axially outer end P3 of the bent part 4f through the apex P1 of the hump 1h on the rim sheet 1s is drawn in a cross section of this annular shell 4 perpendicular to the circumferential direction, the line segment 1 is set so that the inclination angle α1 of the line segment 1 relative to the direction perpendicular to the tire axis is within ±5° (preferably, within ±2°). In the case where the aforementioned hump 1h is formed to have a planar top part with a certain height, the center of the width of the planar top part is defined as the apex P1.

By setting the direction of the line segment L1 extending from the axially outer end P3 of the bent part 4f to the hump apex P1 so as to be substantially perpendicular to the tire axis (the inclination angle α1 of within ±5 degrees) as described above, the load from the annular shell is properly supported during the run-flat running, thus enabling the good run-flat running.

The annular shell 4, in a cross section thereof perpendicular to the circumferential direction, has an area 4s equal to a height B formed linearly, the height B being at least 35% of the cross-sectional height A of the annular shell 4 from the radially inner end. The inclination angle α2 of an extension line L2, extending along the inner surface of the linear area 4s toward the rim 1 side, relative to the direction perpendicular to the tire axis is set to 15 to 30° (preferably, 20 to 25°) axially inward. In addition, the extension line L2 is set to pass the area between the apex P1 of the hump h1 on the rim sheet 1s and the toe tip P2 of the tire bead 2 as shown by solid lines and chain lines.

With such a setting, a part of the load applied to the annular shell during the run-flat running acts as an axially outward force component through the elastic ring 5. Thus, the elastic ring 5 presses the tire bead 2b toward the rim flange 1f side by the force component, thus preventing the tire bead 2b from being demounted from the rim 1.

Embodiments

Tire/wheel assemblies (wheels) of embodiments 1 to 11 and comparative examples 1 to 3, in which the inclination angles α1 and α2 and the position which the extension line L2 passes are varied as shown in Table 1, were produced under the following common conditions: the tire size and the rim size are 205/55R16 and 16×6 ½J, respectively; the annular shell of the run-flat support body is molded from a steel sheet with a thickness of 1 mm; the height of the linear area is set to be 35% of the cross-sectional height of the annular shell; and the elastic rings are so formed of rubber with a JIS-A hardness of 85 as to have the cross sectional shape shown in FIG. 2.

The above 14 types of the tire/wheel assemblies were measured in accordance with the following measurement method in terms of the run-flat durability and whether or not the bead was demounted from the rim, and the results are shown in Table 1.

The results shown in Table 1 reveal that any of the tire/wheel assemblies of the present invention did not have the bead thereof demounted, but exerted good run-flat durability. On the other hand, the bead was demounted in the comparative examples 1 to 3.

[Run-Flat Durability]

A 2500 cc car with the test tire/wheel assembly (inflation pressure: 0 kPa) attached to the front left wheel and with the other tires inflated at 200 kPa was driven in a circuit by a test driver at a speed of 90 km/h. Then, the distance traveled until the tire bead was demounted from the rim and thus the running became impossible was measured. When the tire bead was not demounted, the distance traveled until the tire or the run-flat support body got damaged was measured.

The evaluation results are indicated by indices with the measured travel distance of the tire/wheel assembly of the comparative example 1 defined as 100. Larger indices mean more excellent run-flat durability.

TABLE 1

| | Inclination angle α1 (°) | Inclination angle α2 (°) | Position that Extension Line L2 passes | Run-Flat Durability (Index) | Bead demounting |
|---|---|---|---|---|---|
| Comparative Example 1 | 0 | 0 | P1 | 100 | Demounted |
| Embodiment 1 | 0 | −15 | P1 | 106 | Not demounted |
| Embodiment 2 | 0 | −20 | P1 | 108 | Not demounted |

TABLE 1-continued

| | Inclination angle α1 (°) | Inclination angle α2 (°) | Position that Extension Line L2 passes | Run-Flat Durability (Index) | Bead demounting |
|---|---|---|---|---|---|
| Embodiment 3 | 0 | −25 | P1 | 108 | Not demounted |
| Embodiment 4 | 0 | −30 | P1 | 105 | Not demounted |
| Embodiment 5 | −5 | −20 | P1 | 102 | Not demounted |
| Embodiment 6 | −5 | −25 | P1 | 105 | Not demounted |
| Embodiment 7 | −2 | −25 | P1 | 108 | Not demounted |
| Embodiment 8 | +2 | −25 | P1 | 108 | Not demounted |
| Embodiment 9 | +5 | −25 | P1 | 106 | Not demounted |
| Embodiment 10 | 0 | −20 | Midpoint between P1 and P2 | 106 | Not demounted |
| Embodiment 11 | 0 | −20 | P2 | 106 | Not demounted |
| Comparative Example 2 | 0 | −20 | 5 mm inside of hump | 100 | Demounted |
| Comparative Example 5 | 0 | −20 | 5 mm outside of toe | 100 | Demounted |

Note:
In the fields of "Position that Extension Line L2 passes", P1 means the hump apex; P2, the toe tip of the bead; the inside of hump, the axially inside of the hump; and the outside of toe, the axially outside of the toe. In the fields of "inclination angle", + means axially inward inclination, and − means axially inward inclination.

As described above, according to the present invention, the bend parts are formed at the end parts of the annular shell, and the direction of the line segment L1 extending from the axially outer end P3 of the bent part to the hump apex P1 on the rim is set to be substantially perpendicular to the tire axis. Accordingly, the load from the annular shell during the run-flat running is properly supported, and the good run-flat running can be maintained. In addition, the area of the annular shell equal to the height B, being at least 35% of the cross-sectional height A from the radially inner end, is formed linearly, and the extension line L2 along the inner surface of the linear area is set to incline inward relative to the direction perpendicular to the tire axis and to pass between the hump apex P1 on the rim and the toe tip P2 of the tire bead. Accordingly, it is possible to press the tire bead against the rim flange through the elastic ring with a part of the load applied to the annular shell during the run-flat running to prevent the tire bead from being demounted from the rim.

What is claimed is:

1. A tire/wheel assembly having a run-flat support body inserted into a
hollow part of a pneumatic tire, the run-flat support body including: an annular shell having an outer peripheral side thereof as a support surface and having an inner peripheral side thereof formed into fork-shaped open legs; and elastic tings supporting the end parts of the fork-shaped open legs on a rim,
wherein bent parts bent outward are formed at the end parts of the legs of the annular shell,
in a cross section of the annular shell perpendicular to a circumferential direction, an inclination angle (α1) of a line segment (L1) relative to the direction perpendicular to the tire axis is to within +5°, the line segment (L1) extending from the axially outer end (P3) of each of the bent parts through a hump apex (P1) on the rim, an area of the annular shell equal to a height (B) thereof is formed linearly, the height (B) being at least 35% of a cross-sectional height (A) from the radially inner end of the annular shell, an inclination angle $\alpha 2$ of an extension line (L2) along the inner surface of the linear area relative to the direction perpendicular to the tire axis is set to 15 to 30° axially inward, and the extension line (L2) is set to pass between the hump apex (P1) on the rim and a toe tip (P2) of the tire bead.

2. The tire/wheel assembly according to claim 1, wherein the inclination angle ($\alpha 1$) is set to within +2°.

3. The tire/wheel assembly according to claim 1, wherein the inclination angle ($\alpha 2$) is set to 20 to 25° axially inward.

4. The tire/wheel assembly according to claim 1, wherein the extension line (L2) is set to pass the hump apex (P1) on the rim.

5. The tire/wheel assembly according to claim 2, wherein the inclination angle ($\alpha 2$) is set to 20 to 25° axially inward.

6. The tire/wheel assembly according to claim 2, wherein the extension line (L2) is set to pass the hump apex (P1) on the rim.

7. The tire/wheel assembly according to claim 3, wherein the extension line (L2) is set to pass the hump apex (P1) on the rim.

* * * * *